(12) United States Patent
Pan et al.

(10) Patent No.: US 6,921,593 B2
(45) Date of Patent: Jul. 26, 2005

(54) FUEL ADDITIVES FOR FUEL CELL

(75) Inventors: Alfred I-Tsung Pan, Sunnyvale, CA (US); Eric G. Hanson, Burlingame, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 231 days.

(21) Appl. No.: 09/964,647

(22) Filed: Sep. 28, 2001

(65) Prior Publication Data

US 2003/0064258 A1 Apr. 3, 2003

(51) Int. Cl.$^7$ ................................................. H01M 8/16
(52) U.S. Cl. ........................................... 429/2; 429/43
(58) Field of Search ............................ 429/12, 13, 17, 429/19, 27, 2, 43; 149/45, 46, 109.6

(56) References Cited

U.S. PATENT DOCUMENTS

| | | | |
|---|---|---|---|
| 5,501,915 A | * 3/1996 | Hards et al. ................... | 429/42 |
| 5,981,098 A | * 11/1999 | Vitale ........................... | 429/34 |
| 6,143,443 A | 11/2000 | Kazacos et al. ............. | 429/204 |
| 6,248,460 B1 | 6/2001 | Surampudi et al. ........... | 429/15 |
| 6,294,281 B1 | * 9/2001 | Heller .......................... | 429/43 |
| 6,331,220 B1 | * 12/2001 | Wagaman ...................... | 149/45 |
| 2001/0038934 A1 | * 11/2001 | Berlowitz et al. ............ | 429/19 |

FOREIGN PATENT DOCUMENTS

| EP | 1103593 | 5/2001 |
|---|---|---|
| WO | WO0159034 | 8/2001 |
| WO | WO0221623 | 3/2002 |

OTHER PUBLICATIONS

Hemoglobin–The Complete Blood Count.*
Narayanan S. R. et al: "Studies of the Electro–Oxidation of Methanol and Formaldehyde at Carbon–Supported Platinum and Platinum Alloy Electrodes" Extended Abstract, Electrochemical Society, Princeton, NJ, US vol. 92/2 1992 pp. 78–79 XP000549893.

"Katalog/Handbuch FUR Feinchemikalien 1985–1986" 1985, Janssen Chimica, Belgium XP 002221220 p. 691.

Kirk–Othmer: "Encyclopedia of Chemical Technology, vol. 5" 1993, John Wiley & Sons, NY XP002240246 936417 pp. 764–795.

Kirk–Othmer: "Encyclopedia of Chemical Technology, vol. 23" 1997, John Wiley & Sons, NY XP002240245 971529 pp. 478–541.

Kirk–Othmer: "Encyclopedia of Chemical Technology, vol. 13" 1995, John Wiley & Sons, NY XP002240247 950733 pp. 549–595.

Dr. Jurgen Falbe (HRSG): "Rompp's Lexikon Chemie, 10. Aufl., Bd 3" 1999 Geogg Thieme Verlag, Stuttgart, germany XP002240248 pp. 1650–1653.

* cited by examiner

*Primary Examiner*—Michael Barr
*Assistant Examiner*—Monique Wills

(57) ABSTRACT

A method of enhancing performance of liquid-type fuel cells by adding additives to the liquid fuel. For example, hemoglobin, surfactants, oxygen scavengers, and chelating agents, may be added to the fuel to resolve problems such as CO poisoning of catalyst, wettability of electrodes, and electrode poisoning, and therefore enhance the performance of the fuel cell. The additives may be added individually based on needs, or mixed in a desired ratio for a given type of fuel cell. The additives may be used on a regular basis to improve fuel efficiency and prolong the life span of the fuel cells. The additives may also be pre-packed for field use when high quality fuel is not available.

20 Claims, No Drawings

FUEL ADDITIVES FOR FUEL CELL

TECHNICAL FIELD

The technical field generally relates to fuel cells and in particular to fuel additives that enhance performance of liquid-type fuel cells.

BACKGROUND

A fuel cell is an electrochemical apparatus wherein chemical energy generated from a combination of a fuel with an oxidant is converted to electric energy in the presence of a catalyst. The fuel is fed to an anode, which has a negative polarity, and the oxidant is fed to a cathode, which, conversely, has a positive polarity. The two electrodes are connected within the fuel cell by an electrolyte to transmit protons from the anode to the cathode. The electrolyte can be an acidic or an alkaline solution, or a solid polymer ion-exchange membrane characterized by a high ionic conductivity. The solid polymer electrolyte is often referred to as a proton exchange membrane (PEM).

In fuel cells employing liquid fuel, such as methanol, and an oxygen-containing oxidant, such as air or pure oxygen, the methanol is oxidized at an anode catalyst layer to produce protons and carbon dioxide. The protons migrate through the PEM from the anode to the cathode. At a cathode catalyst layer, oxygen reacts with the protons to form water. The anode and cathode reactions in this type of direct methanol fuel cell are shown in the following equations:

Anode reaction (fuel side): $CH_3OH+H_2O \rightarrow 6H^+ + CO_2 + 6e^-$  I:

Cathode reaction (air side): $\frac{3}{2}O_2 + 6H^+ + 6e^- \rightarrow 3H_2O$  II:

Net: $CH_3OH + \frac{3}{2}O_2 \rightarrow 2H_2O + CO_2$  III:

The goal in methanol fuel processing is complete methanol oxidation for maximum energy generation shown in the equation. Catalysts that promote the rates of electrochemical reactions, such as oxygen reduction and hydrogen oxidation in a fuel cell are often referred to as electrocatalysts. Electrocatalysts are important because the energy efficiency of any fuel cell is determined, in part, by the overpotentials necessary at the fuel cell's anode and cathode. In the absence of an electrocatalyst, a typical electrode reaction occurs, if at all, only at very high overpotentials. Thus, the oxidation and reduction reactions require catalysts in order to proceed at useful rates.

Carbon Monoxide (CO) Poisoning of the Catalyst

Platinum (Pt), an expensive metal, is the best catalyst for many electrochemical reactions, including methanol oxidation. A major obstacle in the development of methanol fuel cells is the loss of electrochemical activity of even the best electrocatalyst due to "poisoning" by CO. CO is an intermediate in the oxidation of methanol to carbon dioxide ($CO_2$). CO is adsorbed at the surface of the Pt due to its special molecular structure and thus blocks the access of new fuel molecules to the catalytically active Pt centers.

CO is a severe poison to Pt electrocatalysts. It significantly reduces fuel cell performance even at levels of 1–10 ppm. A fuel cell which would be useful for commercial applications would preferably be tolerant of CO levels produced in a relatively uncomplicated fuel system, i.e., 100 ppm or greater.

Substantial effort has been devoted to developing a multi-element catalyst such as Pt—Ru and Pt—Ru—Os. The addition of Ruthenium (Ru), for example, helps convert CO into $CO_2$ and relieves the Pt from being poisoned. Attempts have also been made to further reduce the CO concentration, and particularly through a selective oxidation process for the CO. Conventionally, the oxidation of CO to $CO_2$ occurs in the presence of a catalyst and at temperatures above 150° C.

PEM fuel cells, which have potential application in mass transportation, are very sensitive to CO poisoning. Conventional PEM membranes, such as NAFION™, must contain significant amounts of water to conduct protons from the electrode reactions. Accordingly, PEM fuel cells cannot operate at temperatures over about 100° C., and preferably operate at temperatures around 80° C. At these operating temperatures, CO strongly adsorbs to the Pt catalyst to poison the fuel cell performance.

Thus, there remains a need to reduce the level of CO in the fuel system to improve liquid-type fuel cell performance in an effective and commercially viable manner.

Wettability of the Electrodes

Adequate wetting of the electrodes is another major problem for liquid-type fuel cells. To provide a large reaction area, the electrode structures in a liquid-type fuel cell need to be very porous and the liquid fuel solution needs to wet all pores. In addition, $CO_2$ that is evolved at the fuel side electrode needs to be effectively released from the zone of reaction. Adequate wetting enhances the release of $CO_2$ from the electrode. In PEM fuel cells, the PEM also requires water to be effective in conducting protons.

Conventional gas diffusion type fuel cell anode structures are not suitable for use in liquid-type fuel cells. These conventional electrodes have poor fuel wetting properties. The conventional electrodes, however, can be modified for use in liquid-type fuel cells by coating them with an electrode additive that improve their wetting properties, such as NAFION™ which also serves as a PEM.

U.S. Pat. No. 6,248,460 describes a method of wetting an electrode within a liquid-type fuel cell having a sulfuric acid electrolyte by employing perfluorooctanesulfonic acid as an additive to the fuel mixture of the fuel cell. However, the invention is directed to a very specific application, i.e., improving performance of fuel cells having a sulfuric acid electrolyte, and is not applicable to other types of liquid-type fuel cells, such as fuel cells having a PEM.

"Futile Oxidation" at the Anode

As shown in equation II, the cathode of liquid-type fuel cells is exposed to air where the protons react with oxygen to produce water. Some oxygen will inevitably dissolve in the fuel and will be carried to the anode side of the fuel cell. The oxygen will then be oxidized into oxygen ions by the catalyst on the anode. The oxygen ions will then react with the protons produced on the anode by equation I, and form water on the anode. This "futile oxidation" prevents the transfer of protons from the anode to the cathode and hence diminishes the current generated by the fuel cell reaction. There remains a need to efficiently remove the dissolved oxygen from the fuel of a liquid type fuel cell.

Impurities in the Fuel

Impurities in the fuel of a fuel cell may inhibit the desired electrochemical reaction. For example: a methanol based liquid fuel may contain trace amount of sulphur or metal ions, such as $Fe^{++}$, $Cu^{++}$, $Cr^+$, $Ni^{+,}$ and $Zn^{++}$, that are detrimental to the electrolyte and/or catalyst. The impurities may originate from the fuel supply itself or enter the fuel from elsewhere in the system. Some of the impurities may be chemically adsorbed or physically deposited on the surface of the anode catalyst, blocking the active catalyst sites and preventing these portions of the anode catalyst from inducing the desired electrochemical fuel oxidation reaction.

In the absence of countermeasures, the adsorption or deposition of catalyst poisons may be cumulative, so even minute concentrations of poisons in a fuel stream, may, over time, result in a degree of catalyst poisoning which is detrimental to fuel cell performance.

Conventional methods for addressing the problem of fuel impurities include physical filtration and/or chemical treatment of the fuel to remove the impurities. The purification process can be tedious and expensive, and requires specially designed equipment.

SUMMARY

A method of enhancing performance of liquid-type fuel cells by adding additives to the liquid fuel is disclosed. Different additives may be employed to perform different functions, such as reducing CO poisoning of the catalyst, increasing wettability of the electrodes, or removing dissolved oxygen and impurities in the fuel. The additives may be used individually, or premixed in a desired ratio for a given type of fuel cell. The additives may be used on a regular basis to improve fuel efficiency and prolong the life span of fuel cells. The additives may also be pre-packed for field use when high quality fuel is not available. These additives thus provide a convenient and cost-effective way of improving performance of a liquid-type fuel cell.

In an embodiment, hemoglobin may be used as an additive to absorb CO in the fuel and prevent CO poisoning of the catalyst in a fuel cell.

In another embodiment, a wettability control agent, such as a surfactant, may be used as an additive to improve the wetting of the porous electrode.

In another embodiment, an oxygen scavenger, such as ascorbate, may be used as an additive to remove oxygen dissolved in the fuel and prevent the futile oxidation on the anode of the fuel cell.

In yet another embodiment, a chelating agent, such as EDTA, may be used as an additive to remove metal ions from the fuel to prevent the poisoning of the electrode.

Additional advantages and novel features will be set forth in part in the description which follows, and in part will become apparent to those skilled in the art upon examination of the following or may be learned by practice of the invention.

DETAILED DESCRIPTION

A variety of materials can be used as fuel additives for fuel cell applications. Different materials may serve different functions. In an embodiment, hemoglobin may be used as a fuel additive to prevent CO poisoning of Pt based catalyst.

Hemoglobin is the major component of red blood cells which transport oxygen from the lungs to body tissues and facilitates the return transport of $CO_2$. Hemoglobin is a 64,400 kD protein. Each hemoglobin molecule is a tetramer of four smaller polypeptide subunits known as globins. A hemo group, which is an iron-protoporphyrin complex, is associated with each polypeptide subunit, and is responsible for the reversible binding of a single molecule of oxygen. Normal adult hemoglobin is made up of two different kinds of polypeptide globins. A first globin, known as alpha globin, contains 141 amino acid residues. The second, known as beta globin, contains 146 amino acid residues. In normal adult hemoglobin, two of each kind of globin are arranged in the form of a truncated tetrahedron which has the overall shape of an ellipsoid.

Ligands that bind hemoglobin include CO, NO, $CN^-$, and the most physiologically relevant ligand, oxygen. CO is well known to be highly toxic to the oxygen transport function of hemoglobin. In humans, a small amount of CO will cause serious problems, a blood CO concentration of 400 ppm will result in headache and discomfort, and 4000 ppm can be fatal in less than one hour. The reason for this toxicity is that hemoglobin is 235 times more reactive to CO than to oxygen. Binding of CO molecules to hemoglobin decreases the total oxygen carrying capacity of blood by rendering a portion of the hemoglobin molecule unusable for oxygen binding, it also shifts the conformation of the remaining hemoglobin molecule such that the hemoglobin binds the oxygen more avidly, thus making it more difficult for oxygen to be released to the tissues and therefore starving the tissue and organs of vital oxygen supplies. In other words, CO binds to hemoglobin in a way similar to its binding to Pt. Therefore, hemoglobin may be used as a fuel additive to preferentially bind CO and relieve the Pt catalyst from being poisoned by CO.

Hemoglobin is available in either powder or liquid form. The powder form can be dissolved in water or water containing fuels. It is available from, for example, Sigma-Aldrich Inc. The liquid form is available from Biopure as Oxyglobin® solution.

Generally, the amount of hemoglobin that may be added to the fuel is in the range of 0.0001–1% by weight.

In another embodiment, the additive may be a surfactant that decreases interfacial tension of the liquid/catalyst interface and leads to the uniform wetting of the electrode pores and particles by the fuel and water solution, yielding enhanced utilization of the electrocatalyst. Further, the improved wettability also facilitates the release of carbon dioxide from the pores of the electrode.

The surfactant may be an anionic, cationic, amphoteric, nonionic surfactant, or a mixture of compatible surfactants.

Examples of anionic surfactants are water-soluble soaps or water-soluble synthetic surface active compounds. Examples of the soaps are unsubstituted or substituted ammonium salts of higher fatty acids (C10–C22), such as the sodium or potassium salts of oleic acid or stearic acid or of natural fatty acid mixtures such as coconut oil or tallow oil, alkali metal salts, alkaline earth metal salts or fatty acid methyllaurin salts. Examples of synthetic surfactants are alkylarylsulphonates, sulphonated benzimidazole derivatives, fatty alcohol sulphates, or fatty alcohol sulphonates.

Examples of alkylarylsulphonates are the calcium, sodium or triethanolamine salts of dodecylbenzenesulphonic acid, dibutylnaphthalenesulphonic acid, of a condensate of naphthalenesulphonic acid and formaldehyde or the phosphate salt of the phosphoric acid ester of an adduct of p-nonylphenol with 4 to 14 moles of ethylene oxide. Examples of sulphonated benzimidazole derivatives are 2 sulphonic acid groups and one fatty acid radical containing approximately 8 to 22 carbon atoms. Examples of fatty alcohol sulphates or sulphonates are unsubstituted or substituted ammonium salts such as C8–C22 alkyl radical including the alkyl moiety of acyl radicals such as the calcium or sodium salt of lignosulphonic acid, of a mixture of fatty alcohol sulphates from naturally occurring fatty acids, of dodecylsulphate, alkali metal salts or alkaline earth metal salts or the salts of sulphated and sulphonated fatty alcohol/ethylene oxide adducts.

Examples of non-ionic surfactants are polyglycol ether derivatives of aliphatic or cycloaliphatic alcohols having approximately 3 to 30 glycol ether groups and approximately 8 to 20 carbon atoms in the (aliphatic) hydrocarbon moiety; saturated or unsaturated fatty acid and alkylphenols having approximately 6 to 18 carbon atoms in the alkyl moiety of the alkylphenols; water-soluble adducts of polyethylene oxide with ethylenediaminopolypropylene glycol, polypropylene glycol, or alkylpolypropylene glycol having approximately 1 to 10 carbon atoms in the alkyl chain, having approximately 20 to 250 ethylene glycol ether groups and approximately 10 to 100 propylene glycol ether groups in the usual ratio of 1 to 5 ethylene glycol moiety:propylene glycol moiety; fatty acid esters of polyoxyethylene sorbitan such as polyoxyethylene sorbitan trioleate; octylphenoxypolyethoxyethanol; polyethylene glycol; tributylphenoxypolyethyleneethanol; polypropylene/polyethlene oxide adducts; castor oil polyplycol ethers; nonylphenolpolyethoxyethanols.

Examples of cationic surfactants are quaternary ammonium salts in the form of halides, methylsulphates or ethylsulphates which have as N-substituent at least one C8–C22 alkyl radical or unsubstituted or halogenated lower alkyl or benzyl or hydroxy-lower alkyl radicals, such as stearyltrimethylammonium chloride or benzyldi(2-chloroethyl)ethylammonium bromide.

Examples of amphoteric surfactants are the aminocarboxylic and aminosulphonic acids and salts thereof such as alkali metal 3-(dodecylamino)propionate and alkali metal 3-(dodecylamino)propane-1-sulphonate or alkyl and alkylamido betaines such as cocamidopropyl betaine.
Examples of surfactants which may be used in the combination are surfactants from the Teric.RTM. series such as N4 Teric, Teric BL8, Teric 16A16, Teric PE61, Alkanate 3SL3, N9 Teric, G9 A6 Teric or from the Rhodafac.RTM series such as Rhodafac RA 600. Further examples are Calgon.RTM (sodium hexametaphosphate), Borax.RTM (sodium decahydrate borate), soap, sodium lauryl sulphate, or sodium cholate.

Generally, the amount of surfactant that may be added to the liquid fuel is in the range of 0.0001–1% by weight.

In another embodiment, the fuel additive may be an oxygen scavenger that absorbs oxygen in the fuel and therefore, reduces the futile oxidative reaction on the anode. Examples of oxygen scavengers include, but are not limited to, sodium sulfite, sodium bisulfite, ascorbate, hydrazine, hydroquinone, benzmay, and sulfhydryl compounds.

Generally, the amount of oxygen scavenger that may be added to the liquid fuel is in the range of 0.0001–1% by weight.

In yet another embodiment, the fuel additive may be a chelating agent that removes the metal ions that have a detrimental effect on the electrodes. Examples of chelating agents include, but are not limited to, ethylenediaminetetraacetic acid (EDTA) and trans-1,2-diaminocyclohexane-N,N,N',N'-tetraacetic acid (CDTA), and salts thereof.

Generally, the amount of chelating agent that may be added to the liquid fuel is in the range of 0.0001–1% by weight.

The additives may be added individually based on needs, or pre-mixed in a desired ratio for a given type of fuel cell. The additives can be used on a regular basis to improve fuel efficiency and prolong the life span of fuel cells. They can also be pre-packed for field use when high quality fuel is not available. These additives thus provide a convenient and cost-effective way of improving performance of liquid type fuel cells.

Although preferred embodiments and their advantages have been described in detail, various changes, substitutions and alterations can be made herein without departing from the spirit and scope of the fuel additives as defined by the appended claims and their equivalents.

We claim:

1. A method for improving performance of liquid-type fuel cells comprising:
   providing a liquid-type fuel cell having a fuel and a platinum-based catalyst, wherein the fuel comprises methanol, and
   incorporating into the fuel a fuel additive to reduce CO poisoning to the platinum-based catalyst.

2. The method of claim 1, wherein the fuel additive comprises hemoglobin.

3. The method of claim 2, wherein the amount of hemoglobin is in the range of 0.0001–1% by weight.

4. A method for improving performance of liquid-type fuel cells comprising:
   providing a liquid-type fuel cell having an electrode and methanol, wherein the methanol is the liquid-type fuel, said fuel cell also having a liquid-catalyst interface, and
   incorporating into the methanol a fuel additive to increase wettability of the electrode and to decrease interfacial tension of the liquid-catalyst interface.

5. The method of claim 4, wherein the fuel additive comprises surfactant.

6. The method of claim 5, wherein the amount of surfactant is in the range of 0.0001–1% by weight.

7. A method for improving performance of liquid-type fuel cells comprising:
   providing a liquid-type fuel cell having methanol, wherein the methanol is the liquid-type fuel, and
   incorporating into the methanol a fuel additive to reduce dissolved oxygen in the methanol.

8. The method of claim 7, wherein the fuel additive comprises an oxygen scavenger.

9. The method of claim 8, wherein the amount of oxygen scavenger is in the range of 0.0001–1% by weight.

10. A method for improving performance of liquid-type fuel cells comprising:
    providing a liquid-type fuel cell having methanol, a catalyst, and electrolyte, wherein the methanol is the liquid-type fuel, and
    incorporating into the methanol a fuel additive to remove metal ions that are detrimental to the catalyst or electrolyte.

11. The method of claim 10, wherein the fuel additive comprises a chelating agent.

12. The method of claim 11, wherein the amount of chelating agent is in the range of 0.0001–1% by weight.

13. The method of claim 4, wherein the fuel additive is pre-packed for field use.

14. The method of claim 5, wherein the surfactant comprises at least one of an anionic, a cationic, an amphoteric, and a nonionic surfactant.

15. The method of claim 7, wherein the fuel additive is pre-packed for field use.

16. The method of claim 8, wherein the oxygen scavenger comprises at least one of sodium sulfite, sodium bisulfite, ascorbate, hydrazine, hydroquinone, benzmay, and sulfhydryl.

17. The method of claim 10, wherein the fuel additive is pre-packed for field use.

18. The method of claim 11, wherein the chelating agent comprises at least one of ehtylenediaminetetracetic acid and trans-1,2-diaminocyclohexane-N,N,N',N'-tetraacetic acid.

19. The method of claim 2, wherein the hemoglobin is in powder form.

20. The method of claim 1, further comprising:
    pre-packing the fuel additive for field use.

* * * * *